(12) United States Patent
Kinashi et al.

(10) Patent No.: US 11,407,055 B2
(45) Date of Patent: Aug. 9, 2022

(54) ARC WELDING METHOD AND SOLID WIRE

(71) Applicant: Kobe Steel, Ltd., Kobe (JP)

(72) Inventors: Hikaru Kinashi, Kanagawa (JP); Yasuyuki Yokota, Kanagawa (JP); Koji Sato, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 359 days.

(21) Appl. No.: 16/622,666

(22) PCT Filed: Jun. 13, 2018

(86) PCT No.: PCT/JP2018/022643
§ 371 (c)(1),
(2) Date: Dec. 13, 2019

(87) PCT Pub. No.: WO2018/230619
PCT Pub. Date: Dec. 20, 2018

(65) Prior Publication Data
US 2020/0114453 A1    Apr. 16, 2020

(30) Foreign Application Priority Data
Jun. 16, 2017    (JP) .............................. JP2017-118766

(51) Int. Cl.
*B23K 9/173*    (2006.01)
*B23K 35/02*    (2006.01)
*B23K 35/30*    (2006.01)

(52) U.S. Cl.
CPC .......... *B23K 9/173* (2013.01); *B23K 35/0261* (2013.01); *B23K 35/3026* (2013.01)

(58) Field of Classification Search
CPC ................ B23K 9/173; B23K 35/0261; B23K 35/3026; B23K 35/0266; B23K 35/302
USPC .......................................................... 219/136
See application file for complete search history.

(56) References Cited

U.S. PATENT DOCUMENTS

| | | | |
|---|---|---|---|
| 6,608,284 B1 * | 8/2003 | Nikodym | B23K 35/3053 219/137 WM |
| 2008/0169334 A9 * | 7/2008 | Hwang | C25D 3/58 228/101 |
| 2014/0202993 A1 | 7/2014 | Kawamoto et al. | |
| 2016/0008906 A1 * | 1/2016 | Zeniya | B23K 9/02 403/271 |
| 2017/0252850 A1 * | 9/2017 | Ide | B23K 9/091 |

FOREIGN PATENT DOCUMENTS

| | | | |
|---|---|---|---|
| CN | 101417372 A | | 4/2009 |
| CN | 101565842 A | * | 10/2009 |
| JP | 2008-194716 A | | 8/2008 |

(Continued)

OTHER PUBLICATIONS

Jie Zhan, CN-101565842A english translation, (Year: 2009).*

(Continued)

*Primary Examiner* — Phuong T Nguyen
(74) *Attorney, Agent, or Firm* — Oblon, McClelland, Maier & Neustadt, L.L.P.

(57) ABSTRACT

An arc welding method includes performing welding by using a gas and a solid wire. The gas contains Ar. The solid wire includes a steel core wire and a copper plating film formed on a surface of the steel core wire, and the copper plating film has an average grain diameter of 600 nm or less.

12 Claims, 1 Drawing Sheet

(56) References Cited

FOREIGN PATENT DOCUMENTS

JP        2009-101376 A      5/2009
JP           6043969 B2     12/2016

OTHER PUBLICATIONS

Extended European Search Report dated Sep. 18, 2020 in corresponding European Patent Application No. 18816664.9, 8 pages.
Shi Jianglan, "Engineering Materials, vol. 1," Southeast University Press, May 31, 1999, 15 pages (with English language translation).
Tang Bogang, et al., "Welding Materials of Low-Carbon Steel and Low-Alloy High-Strength Steel, vol. 1," China Machine Press, Jul. 31, 1987, 8 pages (with English language translation).
Masami Tanaka, "Solid Wires for MAG and MIG Welding of Mild Steel, High Strength Steel and Low Temperature Service Steel" JIS Handbook 40-2 welding II (manufactures) (JIS Z 3312), Japanese Standards Association, issued on Jan. 21, 2011, pp. 182-201, (with Partial translation).
Shinobu Baba, "List of Brands of Domestic and Foreign Welding Material, 2014 Edition" SANPO Publications, issued on Nov. 20, 2013, pp. 35-49, (with Partial translation).
"Daido's Welding Materials and Joining Techniques" (Manufactures Catalog) p. 37, p. 41, Daido Steel Co., Ltd., issued on Apr. 2, 2014, 5 pages. (with Partial translation).
Masami Tanaka, "Stainless Steel Rods, Wires and Strip Electrodes for Welding" JIS Handbook 40-2 welding II (manufactures) JIS Z 3321, Japanese Standards Association, issued on Jan. 21, 2011, pp. 282-292, (with Partial translation).
"Solid Wires YM-60A" Picture, Shooting Objective: Nippon Steel Welding & Engineering Co., Ltd.'s (production date: Dec. 16, 2014), shooting date: Apr. 2021, 2 pages, (with Partial translation).
International Search Report dated Aug. 14, 2018 in PCT/JP2018/022643 filed Jun. 13, 2018.

* cited by examiner

Grain Map

ARC WELDING METHOD AND SOLID WIRE

TECHNICAL FIELD

The present embodiment relates to an arc welding method and a solid wire.

BACKGROUND ART

A solid wire is widely used in gas shielded arc welding for a thin plate of automobiles or the like. In a case where welding is performed using the solid wire, wire feeding properties are excellent in short-term welding, but in long-term welding, a tip is exhausted due to fusion with the solid wire and arc tends to be unstable.

Here, when a copper plating film is formed on a surface of the solid wire, it is generally common that tip abrasion is reduced and an arc is stable during welding. For example, Patent Literature 1 discloses a solid wire with a copper plating film having a thickness of 0.3 µm to 1.1 µm formed on a surface thereof.

CITATION LIST

Patent Literature

Patent Literature 1: JP 2008-194716 A
Patent Literature 2: Japanese Patent No. 6043969

SUMMARY OF INVENTION

Technical Problem

There is a common welding method (wire-feed controlled short-circuit arc welding method) in which repeated feed of a solid wire in a forward and backward direction is controlled in gas shielded arc welding using the solid wire (see, for example, Patent Literature 2). In this welding method, the wire is moved forward while generating an arc, molten metal of a wire tip melted is brought in contact with a molten pool to extinguish the arc, then the wire is moved back to move the molten metal, and the wire is repeatedly moved forward while generating an arc again, thereby reducing sputtering.

However, when feeding control of the solid wire in the forward and backward direction of the solid wire is performed as described above, a surface of the solid wire and a surface of inside of a torch or inside of a liner slide on each other inside the torch or inside a conduit cable (liner), and a copper plating film formed on the solid wire may be worn out. In this case, the following problems occur: tip fusion cannot be sufficiently reduced during welding, feeding resistance deteriorates, an arc becomes unstable, and the like.

The present invention has been made in view of the above problems, and an object thereof is to provide an arc welding method and a solid wire, excellent in feeding properties and high in arc stability during arc welding.

Solution to Problem

As a result of intensive studies on an arc welding method using a solid wire with a copper plating film formed on a surface thereof, the present inventors have found that abrasion of the copper plating film could be reduced by making a grain diameter in the copper plating film fine. Further, the present inventors have found that this improves slidability of the solid wire, and for example, in the arc welding in which feeding control is performed in a forward and backward direction of the solid wire, feeding properties can be improved, and the arc during welding can be stabilized further. The present invention has been made based on the findings.

That is, in an aspect of the arc welding method of the present invention, welding is performed by using a gas containing Ar, and a solid wire including a steel core wire and a copper plating film formed on a surface of the steel core wire, in which the copper plating film has an average grain diameter of 600 nm or less.

In an aspect of the arc welding method of the present invention, welding may be performed while controlling repeated feed of the solid wire in a forward and backward direction of the solid wire.

Here, the forward and backward direction means a positive direction and reverse direction of wire feeding.

In an aspect of the arc welding method of the present invention, the steel core wire may be made of a mild steel.

In an aspect of the arc welding method of the present invention, the solid wire may contain, in mass %: C: 0.02% or more and 0.15% or less; Si: 0.2% or more and 2.0% or less; Mn: 0.2% or more and 3.0% or less; and Cu: 0.05% or more and 0.5% or less.

In an aspect of the arc welding method of the present invention, the solid wire may further contain, in mass %, at least one of: S: 0.30% or less; Al: 0.1% or more and 1.0% or less; Mo: 0.1% or more and 3.0% or less; Ti: 0.01% or more and 0.3% or less; and Zr: 0.01% or more and 0.3% or less.

In an aspect of the arc welding method of the present invention, the average grain diameter of the copper plating film may be 50 nm or more and 500 nm or less.

An aspect of the solid wire of the present invention is a solid wire including a steel core wire and a copper plating film formed on a surface of the steel core wire, in which the copper plating film has an average grain diameter of 600 nm or less.

In an aspect of the solid wire of the present invention, the steel core wire may be made of a mild steel.

In an aspect of the solid wire of the present invention, the solid wire may contain, in mass %: C: 0.02% or more and 0.15% or less; Si: 0.2% or more and 2.0% or less; Mn: 0.2% or more and 3.0% or less; and Cu: 0.05% or more and 0.5% or less.

In an aspect of the solid wire of the present invention, the solid wire may further contain, in mass %, at least one of: S: 0.30% or less; Al: 0.1% or more and 1.0% or less; Mo: 0.1% or more and 3.0% or less; Ti: 0.01% or more and 0.3% or less; and Zr: 0.01% or more and 0.3% or less.

In an aspect of the solid wire of the present invention, the average grain diameter of the copper plating film may be 50 nm or more and 500 nm or less.

Advantageous Effects of Invention

In the present invention, it is possible to provide an arc welding method and a solid wire, excellent in feeding properties and high in arc stability during arc welding.

DESCRIPTION OF EMBODIMENTS

Hereinafter, an arc welding method and a solid wire in an embodiment of the present invention are described with reference to the drawings.

Figure 1:
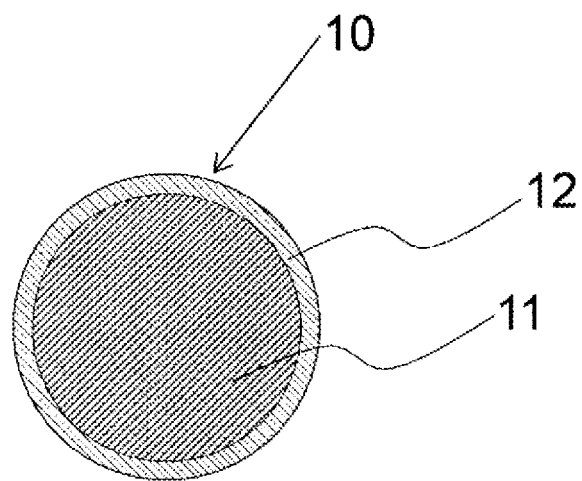
FIG. 1 is a cross-sectional view of a solid wire in an embodiment of the present invention.

The arc welding method in an embodiment of the present invention is directed to a gas shielded arc welding method using the solid wire 10 shown in FIG. 1.

<Solid Wire>

First, a solid wire 10 is described. The solid wire 10 includes a steel core wire 11 and a copper plating film 12 formed on a surface of the steel core wire 11. In the present description, the solid wire may be simply referred to as a wire.

The steel core wire 11 is a wire rod made of a steel having a round cross section. In the present embodiment, the steel core wire 11 is made of a mild steel, but the present invention is not limited thereto. Here, in the present embodiment, the mild steel means a low carbon steel containing C in an amount of 0.01 mass % or more and 0.20 mass % or less.

The copper plating film 12 is formed on the surface of the steel core wire 11 by using a plating solution such as copper sulfate or copper pyrophosphate. In the present embodiment, the steel core wire is plated with copper, and then wire drawing is performed to form the copper plating film 12 having a thickness of, for example, 2 μm or less in average.

In the present embodiment, an average grain diameter of the copper plating film is 600 nm or less. When the average grain diameter of the copper plating film is 600 nm or less, abrasion of the copper plating film can be favorably reduced. From the viewpoint of more favorably reducing the abrasion of the copper plating film, the average grain diameter of the copper plating film is preferably 500 nm or less. The average grain diameter is more preferably 450 nm or less. It is practical that the average grain diameter of the copper plating film is 50 nm or more.

The average grain diameter of the copper plating film in the present embodiment is a diameter in consideration of an area ratio of each grain when the copper plating film having a cross section orthogonal to a longitudinal direction of the wire is measured using an electron back-scattered diffraction (EBSD) device. For example, a diameter d' in consideration of the area ratio is a numerical value calculated from each ratio (c1, c2, c3 . . . ) of any one grain to a total area and a diameter (d1, d2, d3 . . . ) of each of the grains, and is represented as follows.

$$d' = c_1 d_1 + c_2 d_2 + c_3 d_3 + \ldots$$

Here, each ratio (c1, c2, c3 . . . ) of any one grain to a total area is a numerical value calculated from a point number (n1, n2, n3 . . . ) of each of the grains and a full measurement point number n, that is $$c_1 = n_1/n.$$

Therefore, the diameter d' in consideration of the area ratio is calculated as follows.

$$d' = (n_1/n)d_1 + (n_2/n)d_2 + (n_3/n)d_3 + \ldots$$

In the present embodiment, d' is referred to as the average grain diameter.

Figure 2:
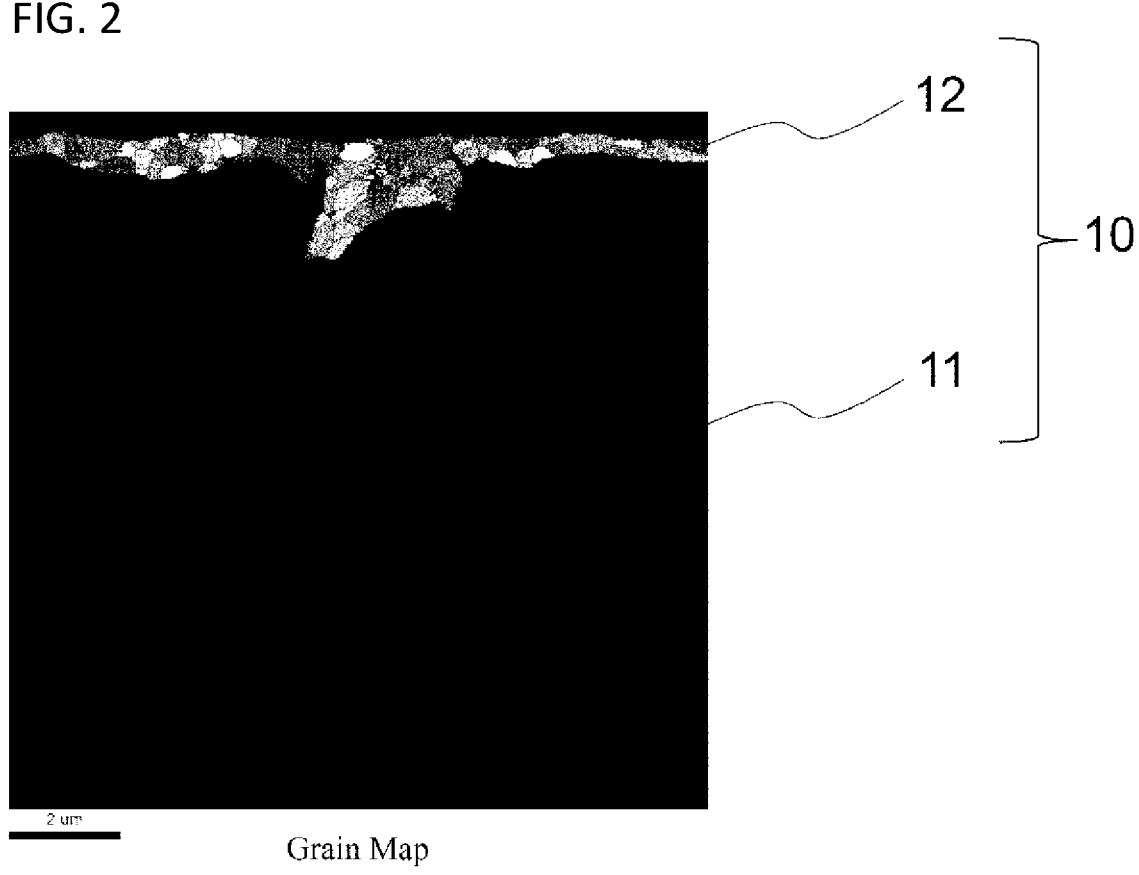
FIG. 2 is an example of a measurement result of the solid wire cross section by EBSD.

FIG. 2 is an example of EBSD measurement of the copper plating film 12 in the cross section orthogonal to the longitudinal direction of the solid wire 10 in the embodiment of the present invention. More specifically, FIG. 2 is an IPF map, and a misorientation of 15° or more between the grains is represented as a grain boundary. In this example, a coarse grain having a grain diameter of 1 μm or more is not present. The average grain diameter d' in the copper plating film 12 shown in FIG. 2 is about 460 nm. The lower side in FIG. 2 is the steel core wire (base metal) 11.

In the copper plating film 12, after the plating is formed, the grains are miniaturized since wire drawing is performed and dynamic recrystallization occurs. Although the copper plating film after plating becomes a mixed grain structure in which grains having a grain diameter of 1 μm or more and grains having a grain diameter of smaller than 1 μm are mixed, the grains are miniaturized and more uniform grain size is achieved since dynamic recrystallization occurs during the wire drawing. In the present embodiment, grains having a grain diameter of greater than 1 μm are not observed in the copper plating film 12 after dynamic recrystallization by wire drawing.

The solid wire 10 is a wire rod with a round cross section and having a diameter of, for example, 0.6 mm or more and 1.8 mm or less. A composition of the solid wire 10 is not particularly limited, but preferably contains C: 0.02 mass % or more and 0.15 mass % or less, Si: 0.2 mass % or more and 2.0 mass % or less, Mn: 0.2 mass % or more and 3.0 mass % or less, and Cu: 0.05 mass % or more and 0.5 mass % or less. Reasons for limiting each component are described below.

A content of each element is a content with respect to a total mass of the wire. Further, in the present description, a percentage based on mass (mass %) is synonymous with a percentage based on weight (wt %).

(C: 0.02 Mass % or More and 0.15 Mass % or Less)

C in a welding wire or a weld metal affects sputtering that occurs during welding. Even though the content of C is small, there is no problem concerning the sputtering, and therefore the lower limit of the content of 0 is not particularly limited, but is practically 0.02 mass % or more. On the other hand, when a large amount of oxygen is contained, C bonds with oxygen during welding to form a CO gas, and a bubble is generated on a droplet surface and bursts, which may cause sputtering. Therefore, the content of C is preferably 0.15 mass % or less, more preferably 0.12 mass % or less, and still more preferably 0.10 mass % or less. C also affects strength of the weld metal, and the content of C is preferably 0.04 mass % or more in order to ensure the strength.

(Si: 0.2 Mass % or More and 2.0 Mass % or Less)

Si in the welding wire is a deoxidizing element and brings about an effect of ensuring the strength and toughness of the weld metal. When an addition amount thereof is small, a blowhole may be generated due to lack of deoxidization, and therefore a content of Si is preferably 0.2 mass % or more, and more preferably 0.4 mass % or more. On the other hand, when a large amount of Si is contained, a large amount of slag may be generated during welding, and weldability may be lowered. Therefore, the content of Si is preferably 2.0 mass % or less, more preferably 1.5 mass % or less, and still more preferably 1.0 mass % or less. When generation of slag is reduced, the content of Si is preferably 0.7 mass % or less.

(Mn: 0.2 Mass % or More and 3.0 Mass % or Less)

Mn in the welding wire is necessary as well as Si in order to bring about effects as a deoxidizing agent or a sulfur scavenger and ensure the strength or toughness of the weld metal. In order to reduce generation of the blowhole due to lack of deoxidization, a content of Mn is preferably 0.2 mass % or more, more preferably 0.4 mass % or more, and still more preferably 0.5 mass % or more. On the other hand, when a large amount of Mn is contained, a large amount of slag may be generated during welding, or the toughness of the weld metal may be significantly reduced by excessively increasing the strength. Therefore, the content of Mn is preferably 3.0 mass % or less, more preferably 2.0 mass % or less, and still more preferably 1.3 mass % or less. For reducing generation of slag, the content of Mn is preferably 1.0 mass % or less.

(Cu: 0.05 Mass % or More and 0.5 Mass % or Less)

Cu is mainly derived from the copper plating film and is contained in the wire, but also is contained in the steel core wire. When a content of Cu is too small, a base may be exposed, and therefore the content of Cu is preferably 0.05 mass % or more. On the other hand, when the content of Cu is too large, a plating film is easily peeled off, and therefore the content of Cu is preferably 0.5 mass % or less, and more preferably 0.3 mass % or less.

In an embodiment, the remainder of the solid wire is Fe and inevitable impurities. If necessary, at least one selected from S, P, Al, Mo, Ti, and Zr may be further added in the following ranges. Further, examples of the inevitable impurities include other elements such as N, O, Cr, and Ni, and it is practical that a content of N or O is 90 ppm or less in the solid wire. Cr, Ni, or the like may be positively added.

(S and P: 0.30 Mass % or Less)

S (sulfur) and P (phosphorus) are all impurity elements, contents thereof are preferably made small as possible, and therefore the lower limits thereof are not limited, but the contents are practically 0.001 mass % or more, respectively. When these are present in a large content more than 0.30 mass %, respectively, the weld metal may cracks. Therefore, both of them are preferably regulated to 0.30 mass % or less (including 0%).

(Al: 0.1 Mass % or More and 1.0 Mass % or Less)

Al is an element contributing to aggregation of a slag. Addition of Al is not essential, but it is difficult to obtain a slag aggregation effect when a content of Al is less than 0.1 mass %, and therefore, when Al is added, the content of Al is preferably 0.1 mass % or more, and more preferably 0.2 mass % or more. On the other hand, when the content of Al is more than 1.0 mass %, sputtering may frequently occur. Therefore, when Al is added, the content thereof is preferably 1.0 mass % or less, more preferably 0.7 mass % or less, and still more preferably 0.4 mass % or less.

(Mo: 0.1 Mass % or More and 3.0 Mass % or Less)

Mo is an element contributing to improvement of the strength. Although addition of Mo is not essential, in order to bring about such an effect well, when Mo is added, a content of Mo is preferably 0.1 mass % or more, and more preferably 0.3 mass % or more. On the other hand, when the content of Mo is more than 3.0 mass %, the effect is saturated since Mo forms an intermetallic compound with Fe at a high temperature. Therefore, when Mo is added, the content thereof is preferably 3.0 mass % or less, more preferably 2.0 mass % or less, and still more preferably 1.5 mass % or less.

(Ti: 0.01 Mass % or More and 0.3 Mass % or Less)

Ti is a strong deoxidizing element and brings about an effect of improving the strength or toughness of the weld metal. When Ti is contained, a content thereof is preferably 0.01 mass % or more. When Ti is contained in a large content being more than 0.3 mass %, a large amount of slag may be generated during welding, and weldability may be lowered. Therefore, the content of Ti is preferably regulated to a range of 0.3 mass % or less.

(Zr: 0.01 Mass % or More and 0.3 Mass % or Less)

Zr brings about an effect of improving arc stability. When Zr is contained, a content thereof is preferably 0.01 mass % or more. However, when the content of Zr is large, a scale layer after an annealing step may become thick, and adhesion of the scale may also increase. Therefore, the upper limit of the Zr content is preferably 0.3 mass %.

<Manufacturing Method>

Hereinafter, a method of manufacturing the solid wire 10 in the embodiment of the present invention is described, but the present invention is not limited thereto. First, molten steel having a specific component composition is melted using a converter, an electric furnace, or the like, and a steel material (billet or the like) is manufactured from the obtained molten steel by continuous casting, ingot making, or the like. Next, after the manufactured steel material is heated, hot working is performed, and further dry cold rolling (cold wire drawing) is performed to obtain, for example, a steel raw wire having a diameter of about 3 mm to 8 mm. Then, annealing or pickling is performed on the steel raw wire as necessary, and copper plating and wire drawing are performed to manufacture the solid wire 10 having a final wire diameter (for example, 0.6 mm to 1.8 mm). In the present embodiment, a common plating bath may be used as a plating bath during copper plating.

Here, in the present embodiment, it is necessary to perform wire drawing for controlling the average grain diameter of the copper plating film. Generally, the solid wire is subjected to wire drawing after copper plating. In the wire drawing after copper plating, dynamic recrystallization and grain growth occur in the copper plating film. That is, dynamic recrystallization occurs by strain introduced by processing and the grains are miniaturized, and the grains grow by heat generation due to processing and the grains are coarsened. For example, JP 2012-143796 A describes that the wire surface is exposed to a high temperature of 400° C. or higher during the wire drawing. As described above, when the copper plating film is exposed to a high temperature during heat generation due to processing, the average grain diameter increases to greater than 600 nm.

Therefore, in the present embodiment, growth of the grains is prevented while causing the dynamic recrystallization in the copper plating film. Generation frequency of the dynamic recrystallization can be controlled, for example, by adjusting strain speed. Specifically, a wire drawing rate of one pass is 20% or less, more preferably 15% or less, and still more preferably 10% or less. In the wire drawing of the solid wire, there is a method using a hole die or a roller die, but in a case of using the hole die, the strain speed is easy to be larger than the case of using the roller die, and therefore it is preferable to reduce the wire drawing rate. In order to reduce a temperature of the copper plating film during processing to prevent the growth of the grains, it is preferable to cool a roll or inject oil. The wire may be cooled in advance to a temperature lower than room temperature. As described above, the copper plating film 12 in the embodiment of the present invention is obtained.

<Arc Welding Method>

Next, an arc welding method in the embodiment of the present invention is described. The arc welding method in the embodiment of the present invention is performed using the above-described solid wire 10 and a gas containing Ar.

Shielding gas to be used in the welding method in the embodiment of the present invention only needs to contain Ar, and may consist of Ar. Alternatively, in addition to Ar, $CO_2$, $O_2$, or the like may be contained, and for example, a shielding gas containing about 5 volume % to 30 volume % of $CO_2$ or $O_2$ with the balance being Ar may be used. $N_2$, $H_2$, or the like as inevitable impurities may also be contained in the shielding gas. In the arc welding method in the embodiment of the present invention, common welding conditions may be appropriately adopted. A material to be welded as a welding object is not particularly limited, and various steel sheets may be used.

According to the solid wire 10 and the arc welding method in the present embodiment configured as described above, since the average grain diameter of the copper plating film 12 is 600 nm or less, the copper plating film is hard to be damaged inside a liner or a torch, which is a feeding path, and it is possible to improve feeding properties and stabilize the arc during arc welding. That is, since the copper plating film is energized in a state in which the copper plating film is formed well when the copper plating film is energized inside the torch, tip fusion is stable, the feeding properties are improved, and arc generation is also stable. In particular, even when repeated feed of a wire in the forward and backward direction of the wire is controlled, the surface of the copper plating film is hard to undergo sliding abrasion or crack between the surface and a contact object, and the feeding properties and the arc stability are improved. Here, the forward and backward direction means a positive direction and reverse direction of wire feeding.

EXAMPLES

Hereinafter, the present invention is described in more detail by raising Examples, but the present invention is not limited to these Examples, and can be carried out by adding changes within the scope of the present invention, all of which are included in the technical scope of the present invention.

Various solid wires with a diameter of 1.2 mm and having a composition and average grain diameter of the copper plating film shown in Table 1 were manufactured by the method described in the embodiment, and welding was performed under the conditions shown below while controlling feed of the wire in the forward and backward direction of the wire (wire-feed controlled short-circuit arc welding method).

(1) Steel Sheet

A steel sheet of 200 mm in length×60 mm in width×3.2 mm in thickness was used. A steel type of the steel sheet was SPHC590.

(2) Welding Position

Lap fillet welding was performed.

(3) Shielding Gas

Ar+20 volume % of $CO_2$ was used as the shielding gas.

(4) Welding Current and Welding Voltage

Welding was performed at a welding current of 240 A, a welding voltage of 18 V, and a welding speed of 100 cm/min.

The wire having a different average grain diameter of the copper plating film was produced by variously changing conditions of wire drawing. In Related Examples 1 to 3, no control of the dynamic recrystallization and the grain growth was made during manufacturing, and the grain diameter of the copper plating film is greater than 600 nm. Comparative Example 1 is an example using a wire prepared by subjecting the wire used in Inventive Example 24 to a heat treatment in an inert gas atmosphere at a temperature of a heating furnace of 200° C. for 10 minutes.

The average grain diameter was obtained using an EBSD device (OIM crystal orientation analysis device manufactured by TSL) by using data measured in a cross section orthogonal to a longitudinal direction of the wire. The average grain diameter is a diameter d' in consideration of an area ratio, and can be easily calculated by a software attached to the device. A numerical value of the average grain diameter was rounded to a value being a multiple of 10. An analysis range of EBSD was 12.5 μm×12.5 μm and was measured at a step of 0.035 μm.

Wire feeding was performed under the conditions having bend portions at two positions between 6 m using a commercially available wire feeder. Evaluation criteria of feeding properties of the wire were defined such that the case where particularly little generation of copper plating powder was observed inside the feeding path was "⊚" being particularly good, the case where little generation of copper plating powder was observed inside the feeding path was "○" being good, and the case where much generation of copper plating powder was observed inside the feeding path was "λ" being not good. The good wire feeding properties mean that abrasion or crack is hard to occur in the copper plating film when a wire is fed.

For arc stability of a welding wire, arcs during welding operation were visually evaluated. Evaluation criteria thereof were defined such that the case where the arcs were consistently stable was "⊚" being particularly good, the case where a part of the arcs were not stable was "○" being good, and the case where the arcs were consistently not stable was "×" being not good.

TABLE 1

| | Wire components (mass %) | | | | | | | | Average grain | Feeding | Arc |
| --- | --- | --- | --- | --- | --- | --- | --- | --- | --- | --- | --- |
| | C | Si | Mn | S | Al | Mo | Ti | Zr | Cu | diameter (nm) | property | stability |
| Inventive Example 1 | 0.14 | 0.6 | 0.7 | 0.03 | — | — | — | — | 0.24 | 430 | ⊚ | ⊚ |
| Inventive Example 2 | 0.03 | 0.5 | 0.9 | 0.05 | — | — | — | — | 0.18 | 460 | ⊚ | ⊚ |
| Inventive Example 3 | 0.06 | 2.0 | 1.1 | 0.01 | — | — | — | — | 0.35 | 390 | ⊚ | ⊚ |
| Inventive Example 4 | 0.06 | 0.3 | 0.4 | 0.01 | — | — | — | — | 0.22 | 580 | ○ | ○ |
| Inventive Example 5 | 0.06 | 1.0 | 0.6 | 0.01 | — | — | — | — | 0.15 | 450 | ⊚ | ⊚ |
| Inventive Example 6 | 0.06 | 0.5 | 0.8 | 0.01 | — | — | — | — | 0.38 | 410 | ⊚ | ⊚ |
| Inventive Example 7 | 0.06 | 1.2 | 2.5 | 0.01 | — | — | — | — | 0.42 | 590 | ○ | ○ |
| Inventive Example 8 | 0.06 | 1.4 | 0.3 | 0.01 | — | — | — | — | 0.25 | 410 | ⊚ | ⊚ |
| Inventive Example 9 | 0.06 | 0.7 | 1.3 | 0.01 | — | — | — | — | 0.33 | 480 | ⊚ | ⊚ |
| Inventive Example 10 | 0.04 | 0.9 | 0.7 | 0.01 | — | — | — | — | 0.26 | 490 | ⊚ | ⊚ |
| Inventive Example 11 | 0.04 | 1.5 | 1.7 | 0.18 | — | — | — | — | 0.27 | 530 | ⊚ | ○ |
| Inventive Example 12 | 0.04 | 1.3 | 1.0 | 0.02 | — | — | — | — | 0.37 | 400 | ⊚ | ⊚ |
| Inventive Example 13 | 0.04 | 1.1 | 1.1 | 0.03 | 0.2 | — | — | — | 0.46 | 490 | ⊚ | ⊚ |
| Inventive Example 14 | 0.04 | 0.7 | 1.1 | 0.03 | 0.8 | — | — | — | 0.23 | 380 | ⊚ | ⊚ |
| Inventive Example 15 | 0.09 | 0.5 | 1.3 | 0.03 | — | 0.2 | — | — | 0.19 | 520 | ⊚ | ○ |
| Inventive Example 16 | 0.09 | 0.8 | 1.0 | 0.03 | — | 2.5 | — | — | 0.25 | 350 | ⊚ | ⊚ |
| Inventive Example 17 | 0.05 | 0.6 | 0.9 | 0.03 | — | — | 0.02 | — | 0.28 | 510 | ⊚ | ○ |
| Inventive Example 18 | 0.05 | 0.5 | 0.6 | 0.03 | — | — | 0.25 | — | 0.35 | 540 | ⊚ | ○ |
| Inventive Example 19 | 0.05 | 0.6 | 0.7 | 0.03 | — | — | — | 0.02 | 0.29 | 410 | ⊚ | ⊚ |

TABLE 1-continued

|  | Wire components (mass %) | | | | | | | | | Average grain | Feeding | Arc |
|  | C | Si | Mn | S | Al | Mo | Ti | Zr | Cu | diameter (nm) | property | stability |
|---|---|---|---|---|---|---|---|---|---|---|---|---|
| Inventive Example 20 | 0.05 | 0.8 | 0.4 | 0.03 | — | — | — | 0.25 | 0.31 | 560 | ○ | ○ |
| Inventive Example 21 | 0.07 | 0.5 | 0.8 | 0.03 | 0.3 | 1.1 | 0.15 | 0.12 | 0.45 | 550 | ○ | ○ |
| Inventive Example 22 | 0.05 | 0.5 | 1.1 | 0.03 | — | — | 0.05 | 0.05 | 0.13 | 470 | ⊙⊙ | ⊙⊙ |
| Inventive Example 23 | 0.04 | 0.5 | 1.5 | 0.03 | 0.3 | 0.5 | 0.08 | 0.05 | 0.28 | 530 | ○ | ○ |
| Inventive Example 24 | 0.04 | 0.9 | 1.3 | 0.03 | 0.5 | — | 0.12 | 0.09 | 0.39 | 280 | ⊙⊙ | ⊙⊙ |
| Inventive Example 25 | 0.04 | 1.0 | 1.1 | 0.03 | 0.6 | 0.4 | 0.09 | 0.13 | 0.18 | 490 | ⊙⊙ | ⊙⊙ |
| Inventive Example 26 | 0.04 | 0.7 | 1.6 | 0.05 | 0.3 | 1.4 | — | 0.16 | 0.22 | 180 | ⊙⊙ | ⊙⊙ |
| Related Example 1 | 0.04 | 0.6 | 0.9 | 0.04 | — | — | — | — | 0.19 | >600 | x | x |
| Related Example 2 | 0.06 | 0.5 | 0.8 | 0.01 | — | — | — | — | 0.38 | >600 | x | x |
| Related Example 3 | 0.04 | 1.1 | 1.1 | 0.03 | 0.2 | — | — | — | 0.46 | >600 | x | x |
| Comparative Example 1 | 0.04 | 0.9 | 1.3 | 0.03 | 0.5 | — | 0.12 | 0.09 | 0.39 | >600 | x | x |

In Table 1, the wire component (mass %) represents a content (mass %) of each component based on the total mass of the wire. The balance is Fe and inevitable impurities. "-" represents that the element is contained as an inevitable impurity.

As shown in Table 1, in Invention Examples 1 to 26 in which the average grain diameter of the copper plating film in the wire is 600 nm or less, the feeding properties and the arc stability were particularly good or good.

On the other hand, in Related Examples 1 to 3 in which the average grain diameter of the copper plating film in the wire is greater than 600 nm, the feeding properties and the arc stability were not good. Similarly, in Comparative Example 1 in which the average grain diameter of the copper plating film in the wire was greater than 600 nm, the feeding properties and the arc stability were not good.

Although the present invention is described in detail with reference to a specific embodiment, it is obvious to those skilled in the art that various changes and modifications may be made without departing from the spirit and scope of the invention. The present application is based on Japanese Patent Application No. 2017-118766 filed on Jun. 16, 2017, contents of which are incorporated herein as reference.

REFERENCE SIGNS LIST

10 Solid wire
11 Steel core wire
12 Copper plating film

The invention claimed is:

1. An arc welding method, comprising:
performing welding by using a gas and a solid wire, wherein
the gas contains Ar,
the solid wire includes a steel core wire and a copper plating film formed on a surface of the steel core wire, and
the copper plating film has an average grain diameter of 600 nm or less,
wherein the welding is performed while controlling repeated feed of the solid wire in a forward and backward direction of the solid wire,
wherein the solid wire comprises, in mass %:
C: 0.15% or less;
Si: 2.0% or less;
Mn: 3.0% or less; and
Cu: 0.5% or less.

2. The arc welding method according to claim 1, wherein the steel core wire is made of a mild steel.

3. The arc welding method according to claim 2, wherein the average grain diameter of the copper plating film is 50 nm or more and 500 nm or less.

4. The arc welding method according to claim 1, wherein the solid wire further comprises, in mass %, at least one of:
S: 0.30% or less;
Al: 1.0% or less;
Mo: 3.0% or less;
Ti: 0.3% or less; and
Zr: 0.3% or less.

5. The arc welding method according to claim 4, wherein the average grain diameter of the copper plating film is 50 nm or more and 500 nm or less.

6. The arc welding method according to claim 1, wherein the average grain diameter of the copper plating film is 50 nm or more and 500 nm or less.

7. A solid wire, comprising:
a steel core wire; and
a copper plating film formed on a surface of the steel core wire,
wherein the copper plating film has an average grain diameter of 600 nm or less,
wherein the solid wire comprises, in mass %:
C: 0.15% or less;
Si: 2.0% or less;
Mn: 3.0% or less; and
Cu: 0.5% or less.

8. The solid wire according to claim 7, wherein the steel core wire is made of a mild steel.

9. The solid wire according to claim 8, wherein the average grain diameter of the copper plating film is 50 nm or more and 500 nm or less.

10. The solid wire according to claim 7, further comprising, in mass %, at least one of:
S: 0.30% or less;
Al: 1.0% or less;
Mo: 3.0% or less;
Ti: 0.3% or less; and
Zr: 0.3% or less.

11. The solid wire according to claim 10, wherein the average grain diameter of the copper plating film is 50 nm or more and 500 nm or less.

12. The solid wire according to claim 7, wherein the average grain diameter of the copper plating film is 50 nm or more and 500 nm or less.

* * * * *